(12) United States Patent
Fukuhara

(10) Patent No.: US 8,643,496 B2
(45) Date of Patent: Feb. 4, 2014

(54) CONTACT FOR FLUID LEVEL DETECTION APPARATUS AND FLUID LEVEL DETECTION APPARATUS

(75) Inventor: Toshiaki Fukuhara, Shimada (JP)

(73) Assignee: Yazaki Corporation, Tokyo (JP)

( * ) Notice: Subject to any disclaimer, the term of this patent is extended or adjusted under 35 U.S.C. 154(b) by 568 days.

(21) Appl. No.: 12/908,929

(22) Filed: Oct. 21, 2010

(65) Prior Publication Data

US 2011/0109463 A1 May 12, 2011

(30) Foreign Application Priority Data

Nov. 9, 2009 (JP) ................................ 2009-256322

(51) Int. Cl.
G08B 21/00 (2006.01)
G01F 23/00 (2006.01)
G01F 23/56 (2006.01)
G01F 23/32 (2006.01)
G01F 15/00 (2006.01)

(52) U.S. Cl.
USPC ........... 340/603; 340/612; 340/616; 340/618; 340/623; 340/624; 340/625; 73/861.77; 73/290 R; 73/305; 73/308; 73/309; 73/317; 73/319

(58) Field of Classification Search
None
See application file for complete search history.

(56) References Cited

U.S. PATENT DOCUMENTS

| | | | |
|---|---|---|---|
| 6,209,392 B1 * | 4/2001 | Rapala | 73/317 |
| 6,425,288 B1 * | 7/2002 | Pauer | 73/305 |
| 6,599,096 B1 * | 7/2003 | Totten et al. | 417/133 |
| 6,724,201 B2 * | 4/2004 | Sato et al. | 324/714 |
| 6,792,800 B2 * | 9/2004 | Tsuda | 73/313 |
| 7,100,442 B1 | 9/2006 | Hüttinger | |
| 8,284,064 B2 * | 10/2012 | Benner et al. | 340/603 |
| 2006/0176143 A1 | 8/2006 | Ebnet | |
| 2009/0000376 A1 * | 1/2009 | Kawaguchi et al. | 73/317 |
| 2010/0090842 A1 | 4/2010 | Benner et al. | |
| 2010/0223993 A1 * | 9/2010 | Shimizu et al. | 73/317 |
| 2012/0000282 A1 * | 1/2012 | Oike et al. | 73/317 |

FOREIGN PATENT DOCUMENTS

| | | | |
|---|---|---|---|
| DE | 44 39 829 A1 | 5/1996 | |
| DE | 198 43 598 A1 | 3/2000 | |
| DE | 198 42 243 A1 | 4/2000 | |

(Continued)

OTHER PUBLICATIONS

Office Action, dated Jan. 3, 2013, issued by the German Patent and Trade Mark Office in counterpart German Patent Application No. 10 2010 043 307.1.

(Continued)

*Primary Examiner* — Julie Lieu
(74) *Attorney, Agent, or Firm* — Sughrue Mion, PLLC

(57) ABSTRACT

A contact is provided for a fluid level detection apparatus. The contact includes a contact support spring for rotating in response to a change in fluid level. The contact support spring includes a cantilevered spring arm having a proximal end to be fixed to a holder and a free end, and a contact support which is provided at the free end. First and second contacts are attached to the contact support in first and second positions, respectively, the first position being set at one end opposite to an end at which the second position is set. The joining position of the contact support and cantilevered spring arm is set so that a pressing load applied to the first and second contacts on the contact support by the flexure displacement of the contact support spring falls within a predetermined range.

6 Claims, 9 Drawing Sheets

(56) References Cited

FOREIGN PATENT DOCUMENTS

| DE | 10 2005 005 752 A1 | 8/2006 |
|----|---------------------|--------|
| DE | 200 23 907 U1 | 8/2007 |
| DE | 10 2007 021 027 A1 | 11/2008 |
| DE | 10 2008 030 099 A1 | 1/2009 |
| JP | 2009-008535 A | 1/2009 |
| WO | 2008135324 A1 | 11/2008 |

OTHER PUBLICATIONS

Communication issued on Mar. 1, 2012 by the State Intellectual Property Office of the P.R. of China in the counterpart Chinese Patent Application No. 201010536710.8.

* cited by examiner

CONTACT FOR FLUID LEVEL DETECTION APPARATUS AND FLUID LEVEL DETECTION APPARATUS

BACKGROUND OF THE INVENTION

1. Technical Field

The present invention relates to a contact for a fluid level detection apparatus and a fluid level detection apparatus.

2. Background Art

FIGS. 5 to 7 show a conventional fluid level detection apparatus.

A fluid level detection apparatus 1 shown in FIGS. 5 to 7 is disclosed in JP-A-2009-8535. The fluid level detection apparatus 1 includes a frame 3 which is fixed within a vessel which stores a fluid whose level is to be detected, a holder 5 which is supported on the frame 3 so as to rotate in response to a change in fluid level within the vessel, a contact 7 which is fixed to the holder 5, a resistor plate 9 which is fixedly provided on the frame 3 and output terminals 11a, 11b which output a signal indicating a level of the fluid within the vessel.

As is shown in FIG. 5, the holder 5 is pivotally and rotatably attached to a rotating fulcrum 13 on the frame unit 3. A proximal end of a float arm 15, which has a float attached to a distal end thereof, is fixed to the holder 5. The holder 5 rotates about the rotating fulcrum 13 by virtue of a rotating moment M1 (refer to FIG. 5) which is applied to the float arm 15 by buoyancy acting on the float.

As is shown in FIG. 6, the contact 7 includes a contact support spring 17 made of a conductive material which is fixed to the holder 5 in a cantilevered fashion so as to rotate together with the holder 5 and a first contact 18 and a second contact 19 which are made of a conductive material and which are attached to a free end side of the contact support spring 17.

As is shown in FIG. 7, the contact support spring 17 includes a first support spring 21, a second support spring 22, and a connecting portion 23 which connects the first support spring 21 and the second support spring 22 together at fixed ends (proximal ends) thereof. At a free end (distal end) of the first support spring 21 is set a first position 21a to which the first contact 18 is attached. At a free end (distal end) of the second support spring 22 is set a second position 22a to which the second contact 19 is attached. Consequently, the first support spring 21 and the second support spring 22 are integrated with each other at the proximal ends thereof for electrical conduction.

As is shown in FIG. 6, the contact support spring 17 is supported on the holder 5 in the cantilevered fashion by the connecting portion 23 being fixed to the holder 5.

The first support spring 21 which constitutes the contact support spring 17 includes a pair of right and left plate springs 21b, 21c which are connected together at proximal ends thereof by the connecting portion 23. The pair of right and left plate springs 21b, 21c are connected together at free ends thereof, and the first position 21a is set at a junction 21d where the pair of right and left plate springs 21b, 21c are so connected. The first support spring 21 functions as a single cantilever when a bending load is applied to the first position 21a set at the free end thereof.

As is shown in FIGS. 7 and 8, either of the pair of plate springs 21b, 21c which constitute the first support spring 21 functions as a cantilever having a uniform rectangular section whose width and height dimensions are expressed as "b" and "h", respectively, and a length expressed as "L2."

The second support spring 22 also has a similar configuration to that of the first support spring 21. Namely, the second support spring 22 includes a pair of right and left plate springs 22b, 22c which are connected together at proximal ends thereof by the connecting portion 23. The pair of right and left plate springs 22b, 22c are connected together at free ends thereof, and the second position 22a is set at a junction 22d where the pair of right and left plate springs 22b, 22c are so connected. The second support spring 21 functions as a single cantilever when a bending load is applied to the second position 22a set at the free end thereof.

As is shown in FIGS. 7 and 8, either of the pair of plate springs 22b, 22c which constitute the second support spring 22 functions as a cantilever having a uniform rectangular section whose width and height dimensions are expressed as "b" and "h", respectively, and a length expressed as "L1."

As is shown in FIGS. 6 and 7, the resistor plate 9 includes a first sliding resistor 25 and a second sliding resistor 26 which are fixedly attached to the resistor plate 9.

The first sliding resistor 25 is attached to the resistor plate 9 so that the first contact 18 is brought into press contact with the first sliding resistor 25 with the contact support spring 17, as is shown in FIG. 6, put in a state in which the free end thereof is flexed to be displaced in a direction indicated by an arrow B in FIG. 6 (to be exact, the free end of the first support spring 21 is flexed to be displaced in the direction indicated by the arrow B in FIG. 6). In addition, the first sliding resistor 25 is formed into an arc shape so that the first contact 18 is allowed to slide thereon when the holder 5 rotates.

On the other hand, the second sliding resistor 26 is attached to the resistor plate 9 so that the second contact 19 is brought into press contact with the second sliding resistor 26 with the contact support spring 17, as is shown in FIG. 6, put in the state in which the free end thereof is flexed to be displaced in the direction indicated by the arrow B in FIG. 6 (to be exact, the free end of the second support spring 22 is flexed to be displaced in the direction indicated by the arrow B in FIG. 6). In addition, the second sliding resistor 26 is formed into an arc shape so that the second contact 19 is allowed to slide thereon when the holder 5 rotates.

One end side of the first sliding resistor 25 is electrically connected to the output terminal 11a. In addition, one end side of the second sliding resistor 26 is electrically connected to the output terminal 11b.

The contact 7 electrically connects the contact portion of the first contact 18 with the first sliding resistor 25 and the contact portion of the second contact 19 with the second sliding resistor 26 via the contact support spring 17. Consequently, the first sliding resistor 25 and the second sliding resistor 26 are electrically connected at the connecting portions where the contact 7 is in contact therewith.

In other words, in the fluid level detection apparatus 1, when the holder 5 rotates in response to a change in level of the fluid in the vessel, the contact positions of the contact 7 with the first sliding resistor 25 and the second sliding resistor 26 are changed by the change in fluid level, whereby a resistance value between the output terminals 11a, 11b is changed. Thus, the fluid level detection apparatus 1 utilizes the resistance value between the output terminals 11a, 11b as a signal indicating the level of the fluid in the vessel.

FIG. 9 shows a cantilever 28 having a length expressed as "L" which constitutes a basic model for designing the contact 7.

Assume that the cantilever 28 has a uniform cross-section whose width and height dimensions are expressed, respectively, as "b" and "h" and a Young's modulus expressed as "E."

The second moment I of area of the cantilever 28 is expressed by the following expression (1).

$$I=bh^3/12 \quad (1)$$

A relationship between y and W, where a flexure displacement y is generated at a free end of the cantilever 28 by a pressing load W under which the sliding resistors 25, 26 are brought into press contact with the free end is expressed by the following expression (2).

$$y=WL^3/(3EI) \quad (2)$$

When the expression (2) is substituted by the expression (1), the load W applied to the free end is expressed by the following expression (3).

$$W=yEbh^3/(4L^3) \quad (3)$$

Since, the pair of right and left plate springs 21b, 21c in the first support spring 21 and the pair of right and left plate springs 22b, 22c in the second support spring 22 are simple beams whose width and height dimensions are b and h, respectively, a load W1 under which the flexure displacement y is generated in the first position 21a of the first support spring 21 becomes twice the load obtained by the expression (3) above and is expressed as below.

$$W1 = 2\{yEbh^3/[4(L2)^3]\} \quad (4)$$
$$= yEbh^3/\{2(L2)^3\}$$

Similarly, a load W2 under which the flexure displacement y is generated in the second position 22a of the second support spring 22 is expressed as below.

$$W2=yEbh^3/\{2(L1)^3\} \quad (5)$$

When designing the contact 7, the following conditions (a) and (b) are required to be met.
(a) In order to ensure reliability in electrical connection between the sliding resistors 25, 26 and the contact support spring 17, in the first support spring 21 and the second support spring 22, the flexure displacement y resulting when the free end sides of the first and second support springs 21, 22 are brought into press contact with the corresponding sliding resistors 25, 26 is set to a certain magnitude or larger.
(b) The sectional dimensions (b and h) and the lengths L1, L2 of the first support spring 21 and the second support spring 22 are set so as to ensure that the load W which generates the flexure displacement y set under (a) is applied to the first support spring 21 and the second support spring 22 and that the first and second support springs 21, 22 have a strength which enables them to bear vibrations applied thereto from the periphery.

In the contact 7 disclosed in JP-A-2009-8535, however, as is shown in FIG. 7, the first contact 18 and the second contact 19 are constructed so as to be supported, respectively, by the corresponding support springs 21, 22 which are provided exclusively to support them. Because of this, for example, in the event that the sectional dimensions and the length L1 of the second support spring 22 which is disposed further inwards are designed to meet the design conditions (a) and (b) described above, the first support spring 21 disposed to surround the outside of the second support spring 22 has to be designed to become larger in size than the second support spring 22, causing a problem that the contact 7 is enlarged in size, which then triggers another problem that an increase in size of the fluid level detection apparatus 1 is called for.

Further, in the contact 7 of JP-A-2009-8535, since the first contact 18 and the second contact 19 are supported individually by the corresponding support springs 21, 22 which are provided exclusively to support them, the loads W1, W2 (refer to the expressions (4), (5) above) under which the flexure displacement y is generated at the free ends of the support springs 21, 22 become entirely pressing loads applied to the contacts 18, 19, respectively, whereby the pressing loads applied to the respective contacts 18, 19 become too high. Therefore, since the wear of the contacts resulting from sliding is promoted, the lives of the contacts are shortened, leading to a problem that it is difficult to enhance the durability of the fluid level detection apparatus 1.

SUMMARY OF THE INVENTION

Then, an object of the invention is to solve the problems, and is more particularly to provide a contact for a fluid level detection apparatus which can realize a reduction in size and an increase in durability of the fluid level detection apparatus and a fluid level detection apparatus which includes the contact.

According to an aspect of the invention, there is a contact provided for a fluid level detection apparatus. The contact includes a contact support spring for rotating in response to a change in fluid level. The contact support spring includes a cantilevered spring arm having a proximal end to be fixed to a holder and a free end, and a contact support which is provided at the free end. First and second contacts are attached to the contact support in first and second positions, respectively, the first position being set at one end opposite to an end at which the second position is set. The joining position of the contact support and cantilevered spring arm is set so that a pressing load applied to the first and second contacts on the contact support by the flexure displacement of the contact support spring falls within a predetermined range.

In the contact for a fluid level detection apparatus according to the aspect of the invention, the first contact and the second contact are brought into press contact with the corresponding sliding resistors by the single cantilevered spring arm, compared with the conventional case in which the respective contacts are brought into press contact with the corresponding sliding resistors by the exclusive support springs, the contact can be made compact in size, and the fluid level detection apparatus having such contact can be made small in size by making the contact compact.

In the configuration in which the first contact and the second contact are brought into press contact with the corresponding sliding resistors by the single cantilevered spring arm and the pressing load produced by the flexure displacement of the free end of the single cantilevered spring arm falls within a predetermined range, or is distributed evenly to the first contact and the second contact, compared with the conventional contact, the contact load applied between the respective contacts and the corresponding sliding resistors can be reduced to substantially one half the contact load of the conventional contact. Because of this, the wear of the contacts due to sliding is suppressed to thereby enhance the lives of the contacts, thereby making it possible to enhance the durability of the fluid level detection apparatus.

BRIEF DESCRIPTION OF THE DRAWINGS

In the accompanying drawings.

DETAILED DESCRIPTION OF THE EXEMPLARY EMBODIMENTS

Figure 1:
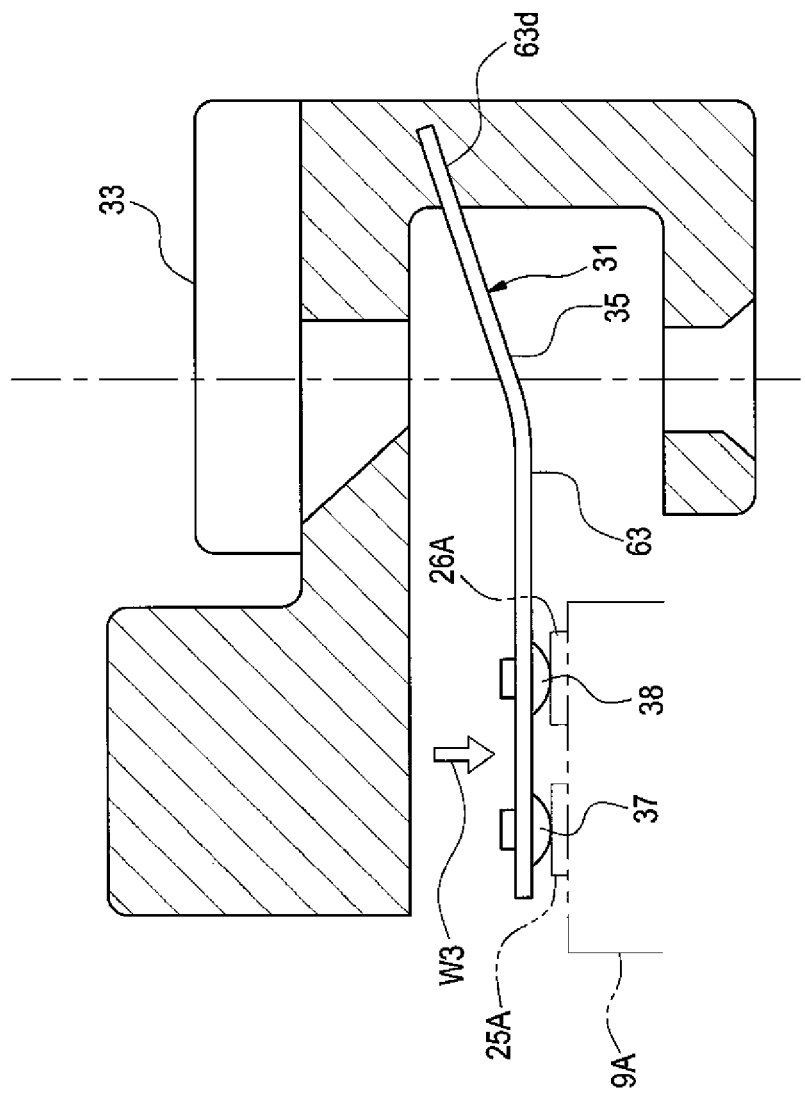
FIG. 1 is a side view of a contact of a fluid level detection apparatus according to an embodiment of the invention.

According to an aspect of the invention, there is provided a contact for a fluid level detection apparatus comprising: a contact support spring made of a conductive material to be fixed in a cantilevered fashion to a holder to rotate in response to a change in fluid level, the contact support spring including: a cantilevered spring arm having a proximal end to be fixed to the holder and a free end; and a contact support which is provided at the free end of the cantilevered spring arm, and in which a first position is set at one end side and a second position is set at the other end side of the contact support, the second position lying closer to the proximal end of the cantilevered spring arm than the first position does; a first contact which is attached to the contact support in the first position to be brought into press contact with a first sliding resistor on the frame by a flexure displacement of the free end of the cantilevered spring arm and the contact support; and a second contact which is attached to the contact support in the second position to be brought into press contact with a second sliding resistor on the frame by the flexure displacement of the free end of the cantilevered spring arm and the contact support, wherein the contact support is integrally joined with the cantilevered spring arm at a joining position in an intermediate position between the first position and the second position and the joining position is set so that a pressing load applied to the first contact and the second contact on the contact support by the flexure displacement of the free end of the cantilevered spring arm and the contact support falls within a predetermined range.

According to the configuration described above, the first contact and the second contact are attached to the contact support. The load which presses the first contact and the second contact against the corresponding sliding resistors is given so as to fall within the predetermined range by the single cantilevered spring arm which is integrated with the contact support at the free end thereof.

Namely, the first contact and the second contact are pressed against the corresponding sliding resistors by the single cantilevered spring arm. Compared with the conventional contact in which the exclusive support spring is provided for each of the contacts, the contact can be made compact. By the contact being made so compact, the fluid level detection apparatus can be made small in size.

The contact may be configured in that the joining position is be set so that the pressing load applied to the contact support by the flexure displacement of the free end of the cantilevered spring arm and the contact support is distributed evenly to the first contact and the second contact.

According the configuration described above, since the pressing load produced by the flexure displacement of the free end of the single cantilevered spring arm is distributed evenly to the first contact and the second contact, compared with the conventional contact in which the pressing loads produced by the flexure displacements of the exclusive support springs constitute entirely the contact loads applied to the contacts, the contact load applied between the respective contacts and the corresponding sliding resistors can be reduced to substantially one half. Because of this, the wear of the contacts due to sliding is suppressed to thereby enhance the lives of the contacts, thereby making it possible to enhance the durability of the fluid level detection apparatus.

The contact may be configured in that the cantilevered spring arm includes a pair of plate springs connected to the contact support at the joining position and a connecting portion which connects the pair of plate springs together at the proximal end of the cantilevered spring arm.

The contact may be configured in that the pair of plate springs are disposed symmetrical with respect to a central axis of the cantilevered spring arm.

The contact may be configured in that the first position and the second position is set along a central axis of the cantilevered spring arm.

According to another aspect of the invention, there is provided a fluid level detection apparatus comprising: a frame; a holder which is supported on the frame so as to rotate in response to a change in fluid level; the contact as defined above, which is fixed in a cantilevered fashion to the holder and rotates together with the holder; a first sliding resistor which is fixedly attached to the frame so that the first contact of the contact slides thereon when the holder rotates; a second sliding resistor which is fixedly attached to the frame so that the second contact of the contact slides thereon when the holder rotates; and an output terminal for outputting a signal indicating a fluid level based on a contact position of the first contact on the first sliding resistor and a contact position of the second contact on the second sliding resistor.

According to the configuration described above, the fluid level detection apparatus can be made small in size by the contact being made so compact. In addition, the durability of the apparatus can be enhanced by the lives of the contact being enhanced by the reduction in contact load applied to each of the contacts of the contact.

An exemplary embodiment of a contact of a fluid level detection apparatus according to the invention will be described in detail by reference to the drawings.

FIGS. 1 to 4 show an embodiment of a contact of a fluid level detection apparatus according to the invention.

Figure 5:
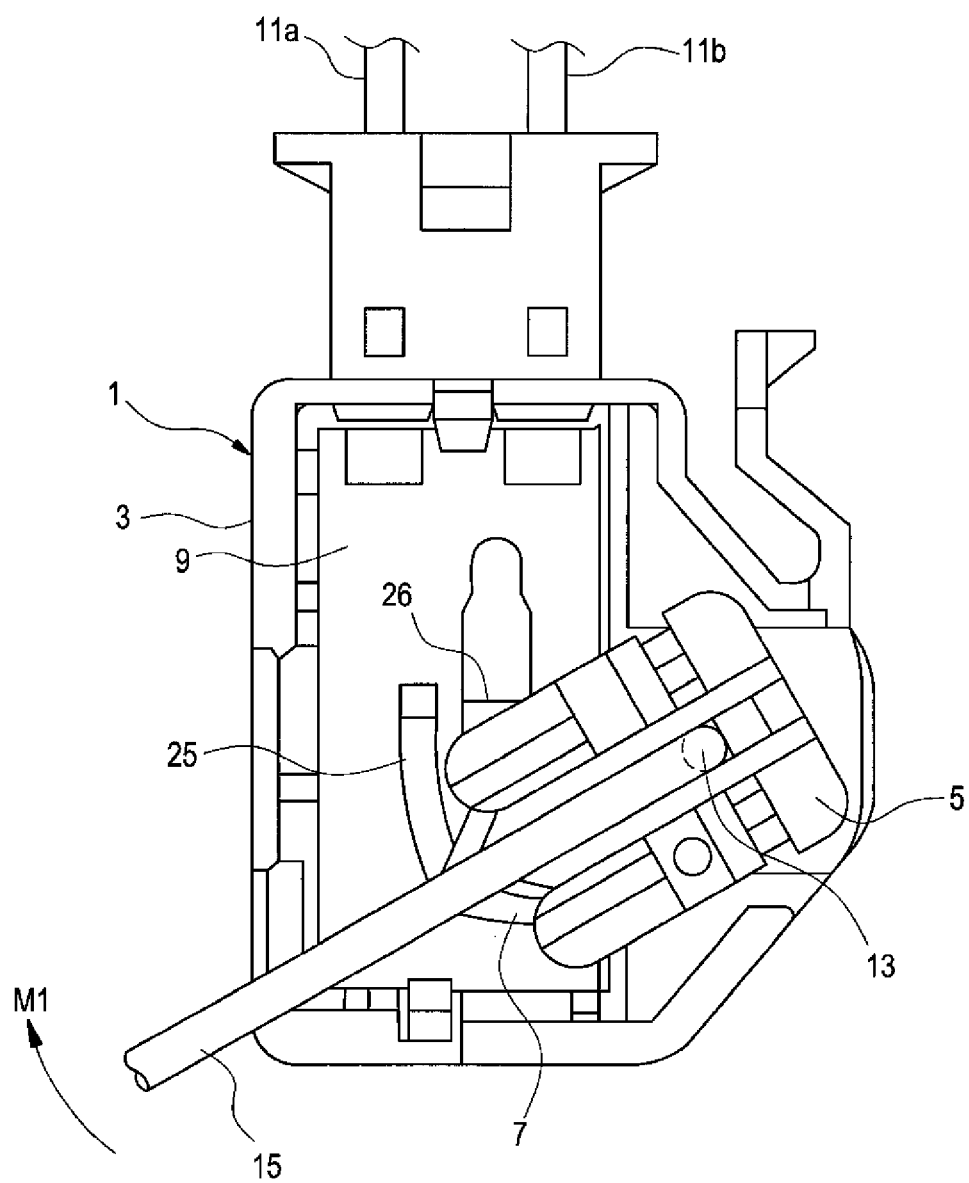
FIG. 5 is a front view showing a schematic configuration of a conventional fluid level detection apparatus.
Figure 6:
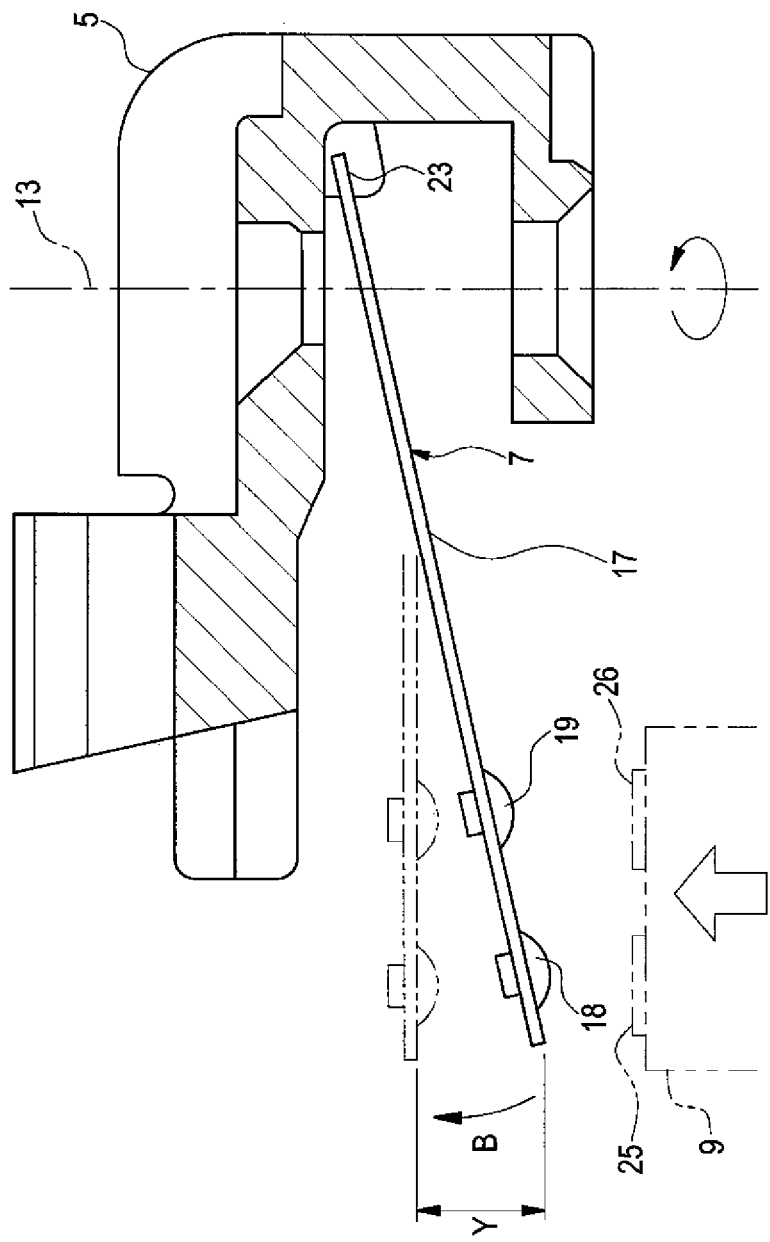
FIG. 6 is a side view showing a state in which a contact shown in FIG. 5 is attached to a holder.

A contact 31 of this embodiment is fixed to a holder 33 in a cantilevered fashion. The holder 33 has the same configuration as that of the conventional holder 5 shown in FIGS. 5 and 6 and is supported on a frame pivotally and rotatably in response to a change in fluid level.

The fluid level detection apparatus which uses the contact 31 of this embodiment may have the same configuration as that of the conventional fluid level detection apparatus 1 exclusive of the contact 31 which will be described below.

Figure 2:
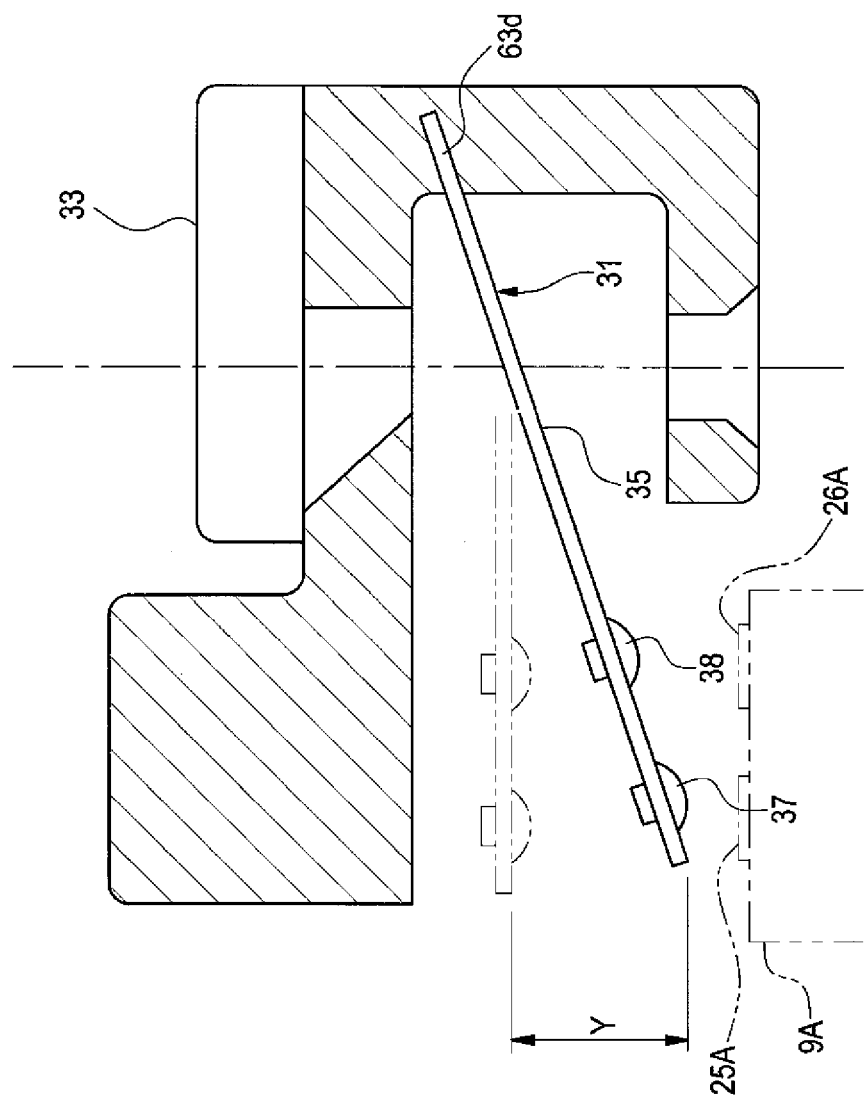
FIG. 2 is a side view showing a state in which a free end of the contact shown in FIG. 1 is not flexed to be displaced.

As is shown in FIGS. 1 and 2, the contact 31 of the embodiment includes a contact support spring 35 made of a conductive material which is fixed to the holder 33 in a cantilevered fashion so as to rotate on the frame, not shown in figure, together with the holder 33. The contact 31 also includes a first contact 37 and a second contact 38 which are fixedly attached to a free end side of the contact support spring 35.

The first contact 37 is fixedly attached to the contact support spring 35 in a first position 41 (refer to FIG. 3) which is set at a free end side of the contact support spring 35. The first contact 37 is brought into press contact with a first sliding resistor 25A on the frame by a flexure displacement of a free end of the contact support spring 35.

The first sliding resistor 25A is provided on a resistor plate 9A which is fixedly attached to the frame. The first sliding resistor 25A is provided into an arc shape so that the first contact 37 on the contact support spring 35 which rotates together with the holder 33 slides on the first sliding resistor 25A when the holder 33 rotates. The resistor plate 9A and the first sliding resistor 25A correspond to the resistor plate 9 and the first sliding resistor 25 shown in FIG. 5, respectively.

The second contact 38 is fixedly attached to the contact support spring 35 in a second position 43 (refer to FIG. 3) which is set in a position at the free end side of the contact support spring 35 which lies closer to a rotating center side of the contact support spring 35 than the first position 41 does. The second contact 38 is brought into press contact with a second sliding resistor 26A on the frame by a flexure displacement of the free end of the contact support spring 35.

The second sliding resistor 26A is provided on the resistor plate 9A. The second sliding resistor 26A is provided into an arc shape so that the second contact 38 on the contact support spring 35 which rotates together with the holder 33 slides on the second sliding resistor 26A when the holder 33 rotates. The second sliding resistor 26A corresponds to the second sliding resistor 26 shown in FIG. 5.

Figure 3:
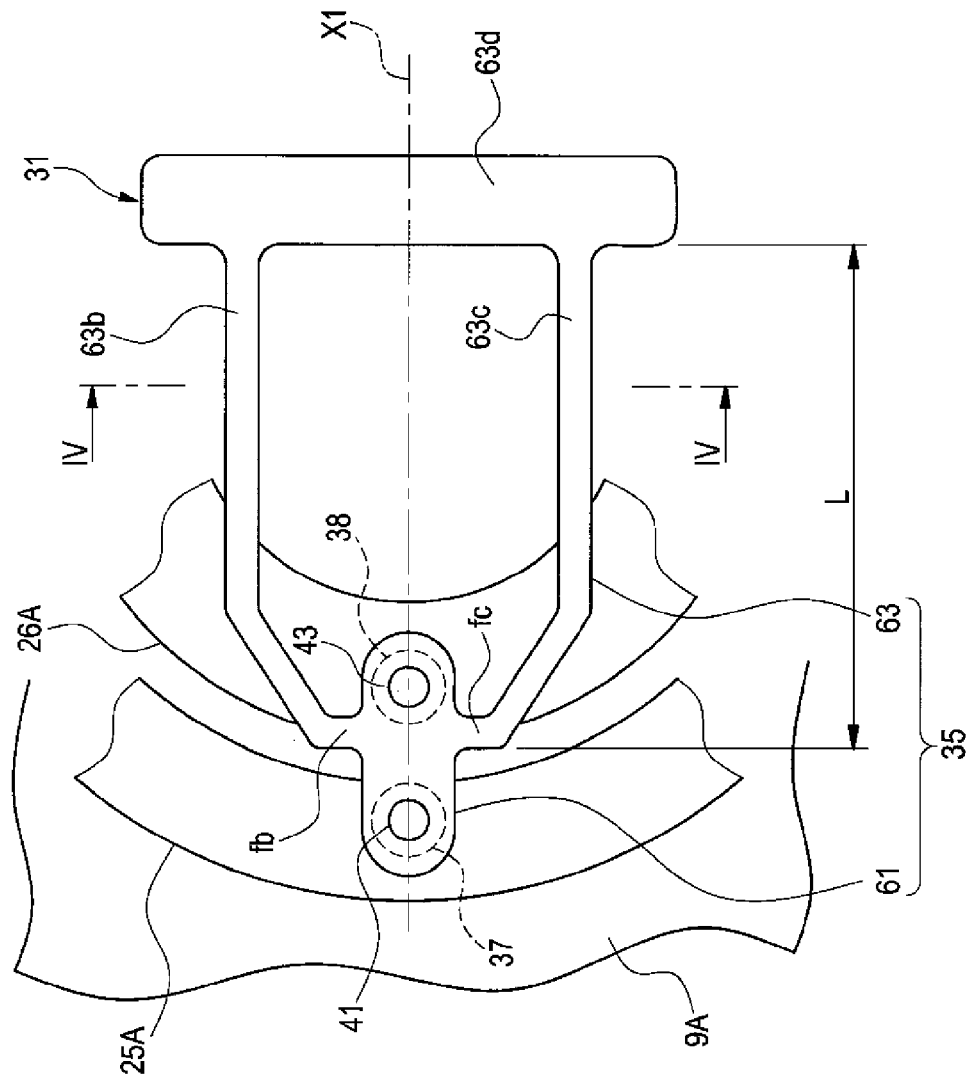
FIG. 3 is a plan view of the contact shown in FIG. 1.
Figure 4:
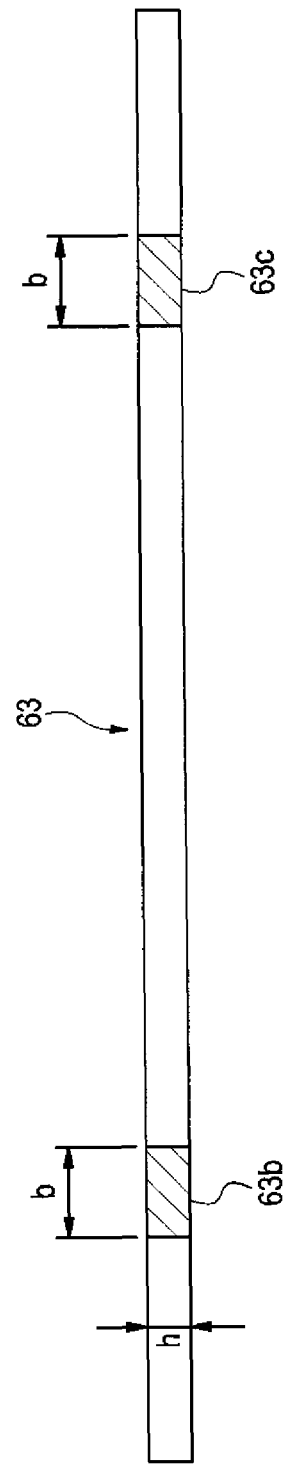
FIG. 4 is a sectional view taken along the line IV-IV in FIG. 3.

As is shown in FIG. 3, the contact support spring 35 of the embodiment includes a single contact support 61 and a single cantilevered spring arm 63 which are formed integrally by pressing sheet metal made of a conductive material.

As is shown in FIG. 3, the contact support 61 is a belt plate which extends along a central axis X1 of the contact support spring 35. The first position 41 is set at one end side and the second position 43 is set at the other end side of the contact support 61.

The cantilevered spring arm 63 includes a pair of right and left plate springs 63b, 63c which are disposed symmetrical with respect to the central axis X1 and a connecting portion 63d which connects proximal end portions of the pair of right and left plate springs 63b, 63c.

The connecting portion 63d, which constitutes a proximal end of the cantilevered spring arm 63, is fixedly supported on the holder 33.

Each of the pair of right and left plate springs 63b, 63c has a uniform rectangular section whose width and height dimensions are expressed as "b" and "h," respectively. In addition, as is shown in FIG. 3, each of the plate springs 63b, 63c has a length expressed as "L" and functions as a cantilever which is fixed to the holder 33 at a proximal end thereof. As is shown in FIG. 3, free ends fb, fc of the pair of right and left plate springs 63b, 63c are integrated with the contact support 61 in an intermediate position between the first position 41 and the second position 43.

With the contact support spring 35 attached to the holder 33 on the frame, the first contact 37 and the second contact 38 are brought into press contact with the first sliding resistor 25A and the second sliding resistor 26A, respectively, which are provided on the resistor plate 9 in such a state that a flexure displacement 'y' is produced at a free end side of the contact support spring 35 as is shown in FIGS. 1 and 2.

In the case of the embodiment, in the contact support spring 35, the joining position between the free ends fb, fc of the pair of right and left plate springs 63b, 63c and the contact support 61 is set so that a pressing load applied to the contact support 61 by a flexure displacement y of the free end thereof is distributed evenly to the first contact 37 and the second contact 38.

Specifically, a pressing load W3 is expressed by the following expression (6) which is applied to the contact support 61 when the flexure displacement 'y' is being produced at the free end of the cantilevered spring arm 63 which includes the pair of right and left plate springs 63b, 63c.

$$W3 = yEbh^3/(2L^3) \quad (6)$$

On the other hand, a contact load W4 applied to the respective contacts 37, 38 is expressed by the following expression (7).

$$W4 = (W3)/2 \quad (7)$$
$$= Ebh^3/(4L^3)$$

In the contact 31 of the embodiment described heretofore, the first contact 37 and the second contact 38 are attached to the single contact support 61. The load for pressing the first contact 37 and the second contact 38 against the corresponding sliding resistors is given by the single cantilevered spring arm 63 which is integrated with the contact support 61 at the free end thereof.

Namely, the first contact 37 and the second contact 38 can be pressed against the corresponding sliding resistors by the single cantilevered spring arm 63. Compared with the conventional contact in which the exclusive support spring is provided for each of the contacts, the contact 31 can be made compact to such an extent that the contact 31 becomes the same in size as the second support spring 22 (refer to FIG. 7) alone. By the contact 31 being made so compact, a fluid level detection apparatus which uses the contact 31 can be made small in size accordingly.

Figure 7:
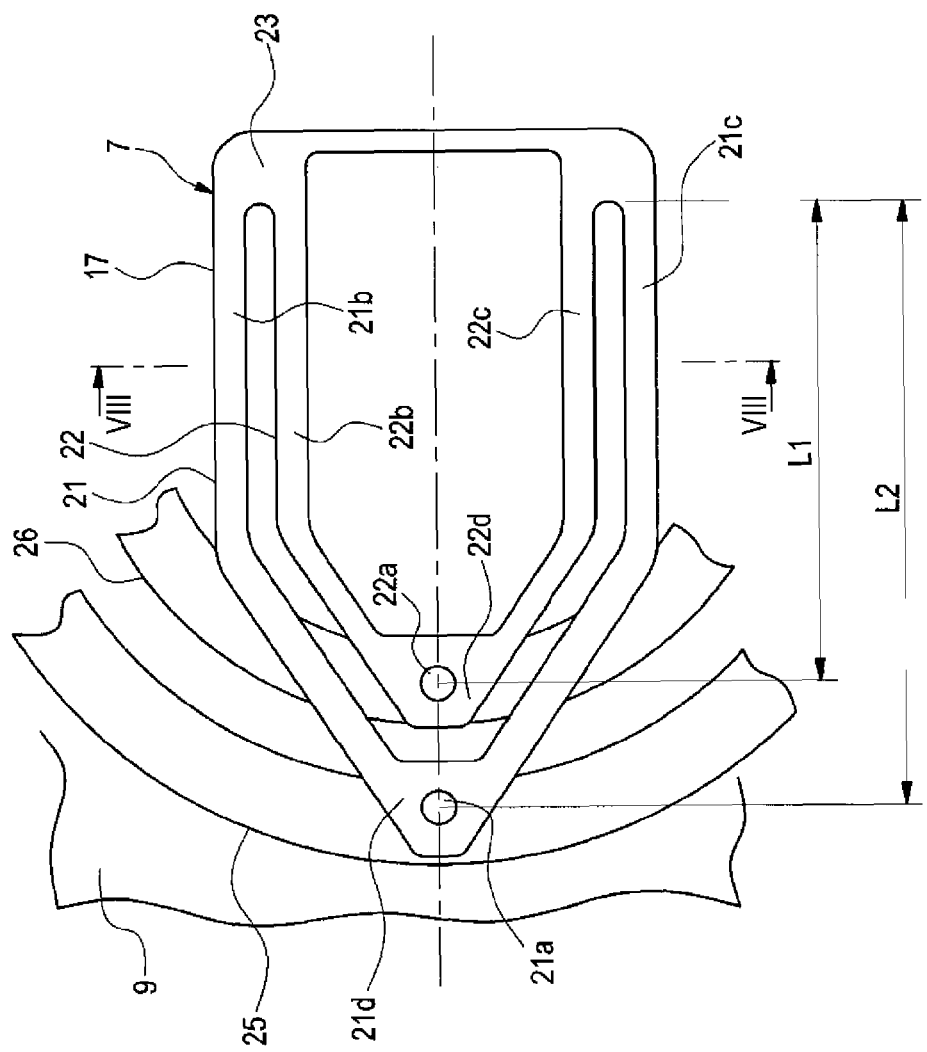
FIG. 7 is a plan view of the contact shown in FIG. 6.
Figure 8:
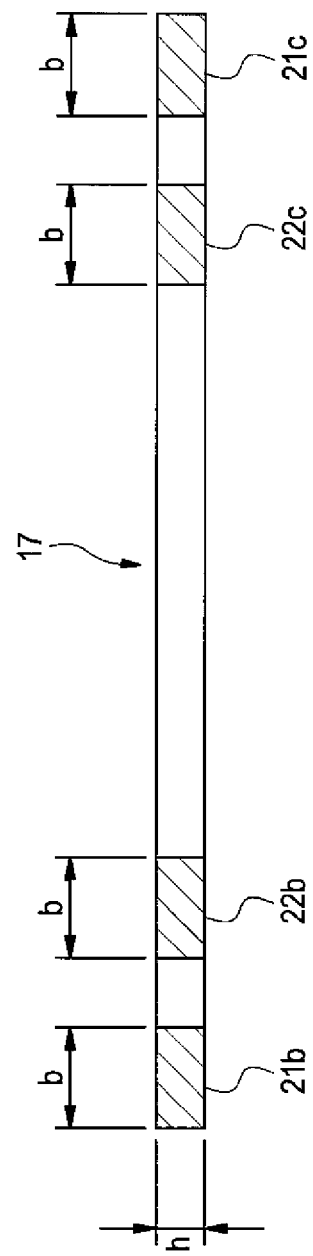
FIG. 8 is a sectional view taken along the line VIII-VIII in FIG. 7.
Figure 9:
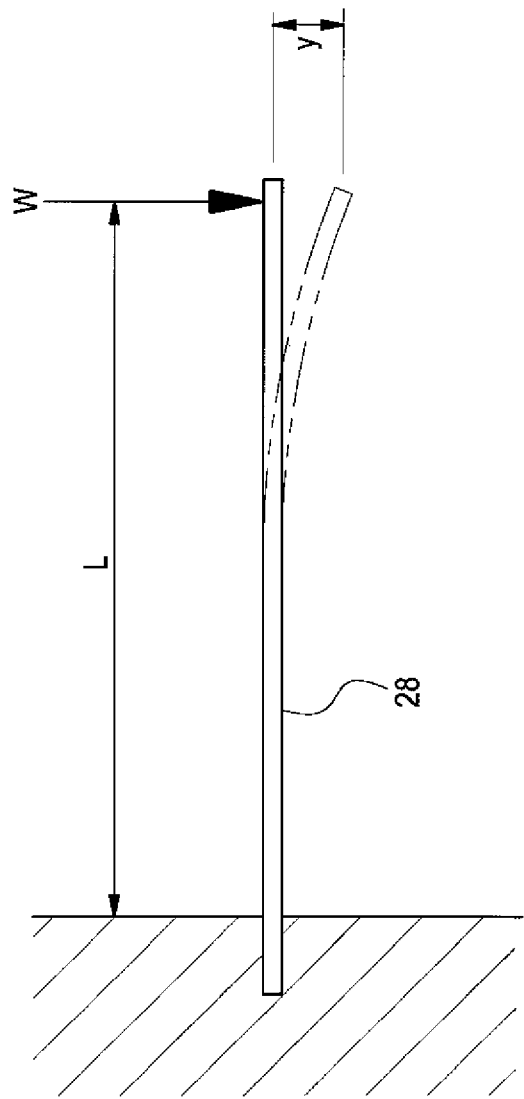
FIG. 9 is an explanatory view of a flexure displacement 'y' at a free end of a cantilever having a uniform rectangular section and a load 'W' which produces the flexure displacement 'y'.

Specifically, in the conventional contact 7 shown in FIG. 7, L2 is 19.5 mm. However, in the contact 31 shown in FIG. 3, L is 15.6 mm, which shows clearly that the contact 31 of the embodiment can be made compact in size or length extremely.

Since the pressing load W3 (refer to FIG. 1) which is produced by the flexure displacement of the free end of the single cantilevered spring arm 63 is distributed evenly to the first contact 37 and the second contact 38, compared with the conventional contact in which the pressing loads produced by the flexure displacements of the free ends of the exclusive support springs constitute entirely the contact loads applied to the corresponding contacts, the contact load applied between the respective contacts 37, 38 and the corresponding sliding resistors 25A, 26A can be reduced to substantially one half. Because of this, the wear of the contacts due to sliding is suppressed to thereby enhance the lives of the contacts. Thus, the durability of the fluid level detection apparatus which uses the contact 31 can be enhanced.

The invention is not limited to the embodiment that has been described heretofore and hence can be modified or improved as required. In addition, the materials, configurations, dimensions, numeric values, forms, numbers and places for disposition of the respective constituent elements in the embodiment described above are arbitrary, provided that they can attain the invention, and the invention is not limited thereto.

For example, in the embodiment, while the pressing load applied to the contact support is described as being distributed evenly to the first contact and the second contact, the pressing load applied to the contact support may be set so as to fall within a predetermined range in consideration of the material of the sliding portions and the material of the contact.

What is claimed is:

1. A contact for a fluid level detection apparatus comprising:
   a contact support spring made of a conductive material to be fixed in a cantilevered fashion to a holder to rotate in response to a change in fluid level, the contact support spring including:
   a cantilevered spring arm having a proximal end to be fixed to the holder and a free end; and
   a contact support which is provided at the free end of the cantilevered spring arm, and in which a first position is set at one end side and a second position is set at the other end side of the contact support, the second position lying closer to the proximal end of the cantilevered spring arm than the first position does;
   a first contact which is attached to the contact support in the first position to be brought into press contact with a first sliding resistor on the frame by a flexure displacement of the free end of the cantilevered spring arm and the contact support; and
   a second contact which is attached to the contact support in the second position to be brought into press contact with a second sliding resistor on the frame by the flexure displacement of the free end of the cantilevered spring arm and the contact support, wherein
   the contact support is integrally joined with the cantilevered spring arm at a joining position in an intermediate position between the first position and the second position and the joining position is set so that a pressing load applied to the first contact and the second contact on the contact support by the flexure displacement of the free end of the cantilevered spring arm and the contact support falls within a predetermined range.

2. The contact as set forth in claim 1, wherein
   the joining position is set so that the pressing load applied to the contact support by the flexure displacement of the free end of the cantilevered spring arm and the contact support is distributed evenly to the first contact and the second contact.

3. The contact as set forth in claim 1, wherein
   the cantilevered spring arm includes a pair of plate springs connected to the contact support at the joining position and a connecting portion which connects the pair of plate springs together at the proximal end of the cantilevered spring arm.

4. The contact as set forth in claim 3, wherein
   the pair of plate springs are disposed symmetrical with respect to a central axis of the cantilevered spring arm.

5. The contact as set forth in claim 1, wherein
   the first position and the second position is set along a central axis of the cantilevered spring arm.

6. A fluid level detection apparatus comprising:
   a frame;
   a holder which is supported on the frame so as to rotate in response to a change in fluid level;
   a contact support as defined in claim 1, which
   a contact support spring made of conductive material to be fixed in a cantilevered fashion to the holder to rotate together with the holder in response to a change in fluid level, the contact support spring including:
   a cantilevered spring arm having a proximal end to be fixed to the holder and a free end; and
   a contact support which is provided at the free end of the cantilevered spring arm, and in which a first position is set at one end side and a second position is set at the other end side of the contact support, the second position lying closer to the proximal end of the cantilevered spring arm than the first position does;
   a first contact which is attached to the contact support in the first position to be brought into press contact with a first sliding resistor on the frame by a flexure displacement of the free end of the cantilevered spring arm and the contact support; and
   a second contact which is attached to the contact support in the second position to be brought into press contact with a second sliding resistor on the frame by the flexure displacement of the free end of the cantilevered spring arm and the contact support, wherein
   the contact support is integrally joined with the cantilevered spring arm at a joining position in an intermediate position between the first position and the second position and the joining position is set so that a pressing load applied to the first contact and the second contact on the contact support by the flexure displacement of the free end of the cantilevered spring arm and the contact support falls within a predetermined range.

\* \* \* \* \*